(12) United States Patent
Nitta

(10) Patent No.: US 8,550,384 B2
(45) Date of Patent: Oct. 8, 2013

(54) DUST CONTROL SYSTEM AND METHOD FOR A STRAW BLOWER

(75) Inventor: Alfred T. Nitta, Loomis, CA (US)

(73) Assignee: Nitta Construction, Inc., Loomis, CA (US)

(*) Notice: Subject to any disclaimer, the term of this patent is extended or adjusted under 35 U.S.C. 154(b) by 1678 days.

(21) Appl. No.: 11/708,977

(22) Filed: Feb. 20, 2007

(65) Prior Publication Data

US 2008/0185464 A1 Aug. 7, 2008

Related U.S. Application Data

(60) Provisional application No. 60/774,465, filed on Feb. 17, 2006.

(51) Int. Cl.
*B02C 21/00* (2006.01)
*B02C 11/08* (2006.01)
*B02C 23/20* (2006.01)

(52) U.S. Cl.
USPC .......... 241/18; 241/21; 241/60; 241/62; 241/605

(58) Field of Classification Search
USPC ............ 241/33, 41, 60, 62, 605, 21, 18
See application file for complete search history.

(56) References Cited

U.S. PATENT DOCUMENTS

| | | | |
|---|---|---|---|
| 2,952,493 A | 9/1960 | Finn | |
| 3,608,838 A * | 9/1971 | Lundin et al. | 241/55 |
| 5,358,184 A * | 10/1994 | Skudrzyk | 241/16 |
| 5,386,947 A * | 2/1995 | Omann | 241/41 |
| 5,441,205 A * | 8/1995 | Kanazumi et al. | 241/41 |
| 5,566,890 A * | 10/1996 | Ricciardelli | 241/20 |
| 5,979,804 A * | 11/1999 | Abrams et al. | 241/15 |
| 6,027,054 A | 2/2000 | Kaye | |
| 6,086,002 A | 7/2000 | Frazier | |
| 6,135,374 A * | 10/2000 | Hansen et al. | 241/46.013 |
| 6,156,128 A * | 12/2000 | Zierler | 134/16 |
| 6,572,039 B1 | 6/2003 | Kruer | |
| 7,081,171 B1 * | 7/2006 | Sabol et al. | 134/18 |
| 7,144,550 B2 * | 12/2006 | Devine et al. | 422/28 |
| 2002/0100825 A1 | 8/2002 | Gregory | |
| 2003/0003974 A1 | 1/2003 | Niermann | |
| 2003/0213168 A1 | 11/2003 | Hesse | |
| 2005/0095070 A1 | 5/2005 | Wysong | |

* cited by examiner

*Primary Examiner* — Faye Francis
(74) *Attorney, Agent, or Firm* — Heisler & Associates

(57) ABSTRACT

The dust control system is adapted for use with a straw blowing machine. The straw blowing machine typically starts with a bale of straw and utilizes a shredder to loosen the straw from the bale. A blower fan then blows the straw to a throat of a chute and the chute then directs the straw where desired. The dust suppression system includes at least one water inlet applying water to the straw before the straw exits an outlet tip of the chute. Water tanks are preferably provided which feed the water inlets in a controllable fashion to meter an appropriate amount of water to cause dust included with the straw to adhere to the straw and avoid degrading air quality when the straw is ejected out of the chute.

19 Claims, 4 Drawing Sheets

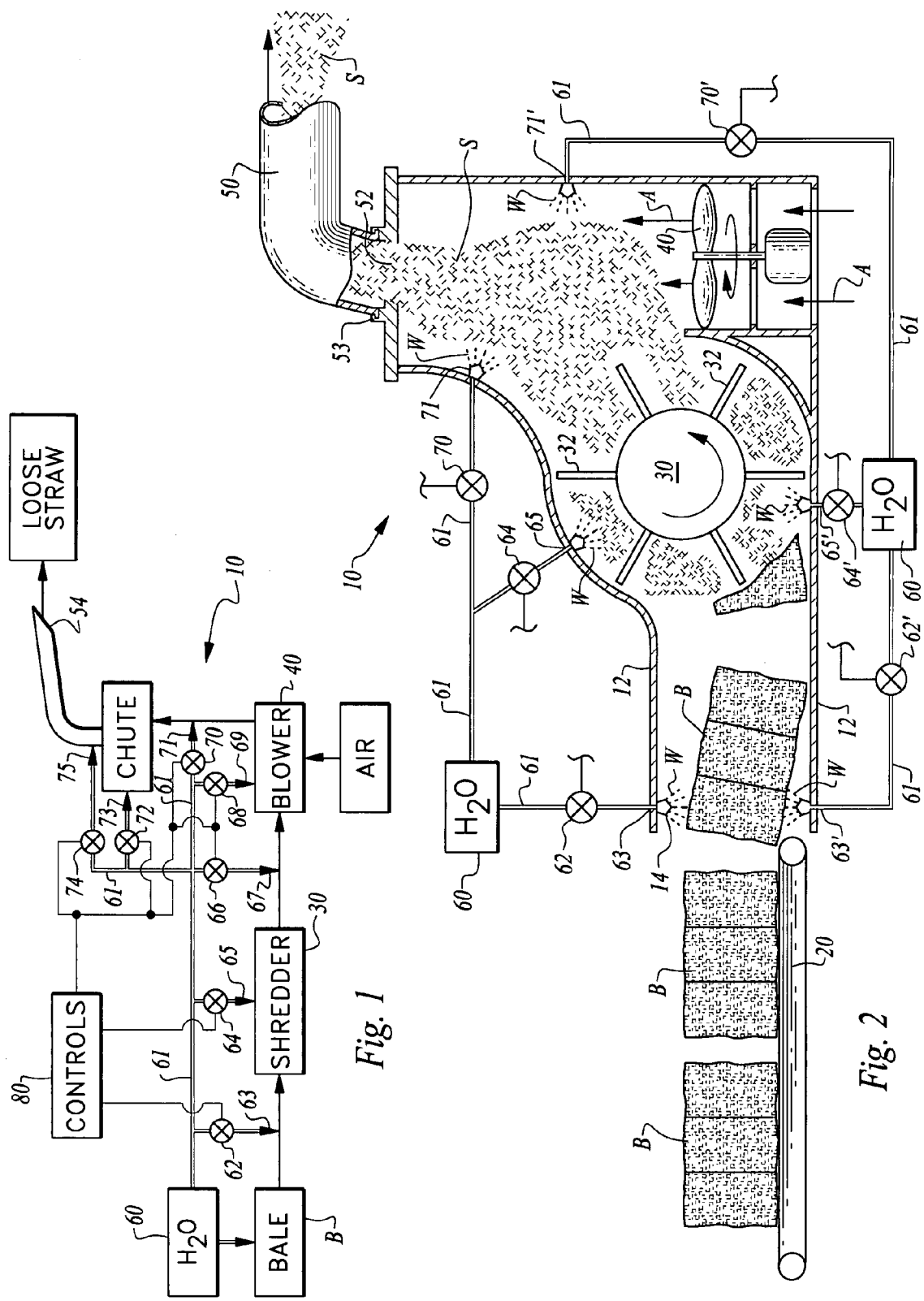

DUST CONTROL SYSTEM AND METHOD FOR A STRAW BLOWER

CROSS-REFERENCE TO RELATED APPLICATIONS

This application claims benefit under Title 35, United States Code §119(e) of U.S. Provisional Application No. 60/774,465 filed on Feb. 17, 2006.

FIELD OF THE INVENTION

The following invention relates to straw blowers which are typically vehicle mounted machines which receive straw, typically in the form of hay bales, shred the straw and then blow the straw with a blower fan through a chute for dispersion onto a surface. More particularly, this invention relates to dust suppression systems for straw blowers which minimize the amount of dust ejected along with straw by the straw blower, such as to avoid negative impacts on air quality.

BACKGROUND OF THE INVENTION

Straw blower machines are known in the prior art which take a bale of straw and blow the straw over an area to which straw is to be applied. Straw blowers are used for various purposes, but most typically are used for erosion control where the straw is placed over ground which is subject to erosion, so that rain and water on the surface is slowed and soil erosion is diminished.

Typical straw blowers include a chute from which the straw is blown, which is often rotatable and otherwise adjustable so that a user can direct the straw where desired. A large blower fan upstream of the chute blows the straw into the chute with sufficient force and with associated air so that the straw entrained within the air is blown out of the chute. Upstream of the fan a bale shredder is typically provided which shreds a bale of straw into loose straw that is then fed into the fan. Often a conveyer belt is provided which feeds a series of bales of straw into the bale shredder. The entire vehicle is often on wheels and either self-propelled or configured to be towed behind a separate vehicle, such as a truck loaded with additional bales of straw. One type of typical prior art straw blower is provided by the Finn Equipment Company of Cincinnati, Ohio.

One problem with prior art straw blowers is that they blow any dust and dirt associated with the straw (as well as very fine straw particles) in a way which often causes clouds of dust and small particles to be generated. These clouds do not quickly settle to the ground and so can travel to an undesirable location. Also, an air quality problem is generated. In particular, air quality managers evaluate air pollution sources in many ways with one measure being "opacity." For instance, California air quality regulations require that a source have its emissions not exceed forty percent opacity for more than three minutes in every hour. Some counties in California (i.e. Placer County) are even more strict, with a twenty percent opacity limit. Also, visible emissions of fugitive dust must not cross property boundaries. Accordingly, a need exists to suppress dust emissions from straw blowers.

SUMMARY OF THE INVENTION

With this invention, the problem of air quality degradation through utilization of a straw blower is mitigated. In particular, with this invention a source of water or other liquid is provided. Typically, the liquid to be used is water within a tank mounted to the straw blower vehicle itself. The water or other liquid could alternatively be provided from a conduit coupled to some other source of water.

The water is pressurized either within the tank (or other source) or through utilization of a pump. The water is then sprayed into at least one location between an inlet where the bales of straw enter the bale shredder and an outlet tip of the straw blower chute. In a simplest form of this invention, only one liquid outlet could be provided, coupled to the source of liquid, with this inlet directing water against the straw within the system. Most preferably, the water is directed through a form of spray nozzle so that the water is in the form of a mist and so that maximum coating of the straw with water can occur. Dust particles within the straw then adhere to the straw.

In a most preferred form of the invention, a series of valves are provided and at least three locations are provided for inlets of water or other liquid at various different locations within the overall straw blower system. For instance, a first inlet can be provided just downstream from the bale shredder. A second inlet can be provided directly upstream of the blower. A third inlet can be provided directly downstream of the blower. Other locations where water could be provided are within various portions of the chute and elsewhere along the straw path.

The inlets can be provided on multiple sides of the straw pathway, such as on lateral sides and/or the top or bottom of the enclosure through which the straw is passing. In this way, a maximum coating of the straw with water can occur, and so that maximum capture of dust can occur. When the wetted straw is blown out of the chute, it is not so wet that it cannot be blown, but no significant dust and fine particulates are blown into the surrounding atmosphere along with the straw.

In a most preferred form of this invention, the tank is not pressurized and is filled with water. The pump can be driven by a motor on board the vehicle on which the straw blower is mounted and which motor also powers the various different components of the straw blowing machinery.

OBJECTS OF THE INVENTION

Accordingly, a primary object of the present invention is to minimize or eliminate an amount of dust ejected along with straw by a straw blowing machine.

Another object of the present invention is to provide a kit for retrofitting onto an existing straw blowing machine to reduce an amount of dust ejected with straw by the machine.

Another object of the present invention is to provide a method for reducing an amount of dust ejected by a straw blowing machine.

Another object of the present invention is to facilitate the utilization of a straw blowing machine in a way which minimizes negative effects upon air quality and which satisfies air quality regulations.

Another object of the present invention is to provide a straw blowing machine which wets the straw before ejection from the straw blowing machine so that the straw is ejected with a minimum of dust and air quality degradation.

Another object of the present invention is to provide a dust control system for a straw blower which can be controlled by a user who is manning a chute of a straw blower.

Another object of the present invention is to provide a straw blower with onboard dust suppression system which has sufficient water capacity so that the water supply lasts as long as a typical straw supply associated with deployment of the straw blower at a job site.

Other further objects of the present invention will become apparent from a careful reading of the included drawing figures, the claims and detailed description of the invention.

BRIEF DESCRIPTION OF THE DRAWINGS

FIG. 1 is a block diagram illustrating the flow of straw through the system, the flow of air through the system, the flow of water into the system and how controls interact with valves at various different locations within the system.

FIG. 2 is a schematic representation of the system of this invention generally in the form of a full sectional view of the entire system.

DESCRIPTION OF THE PREFERRED EMBODIMENT

Figure 3:
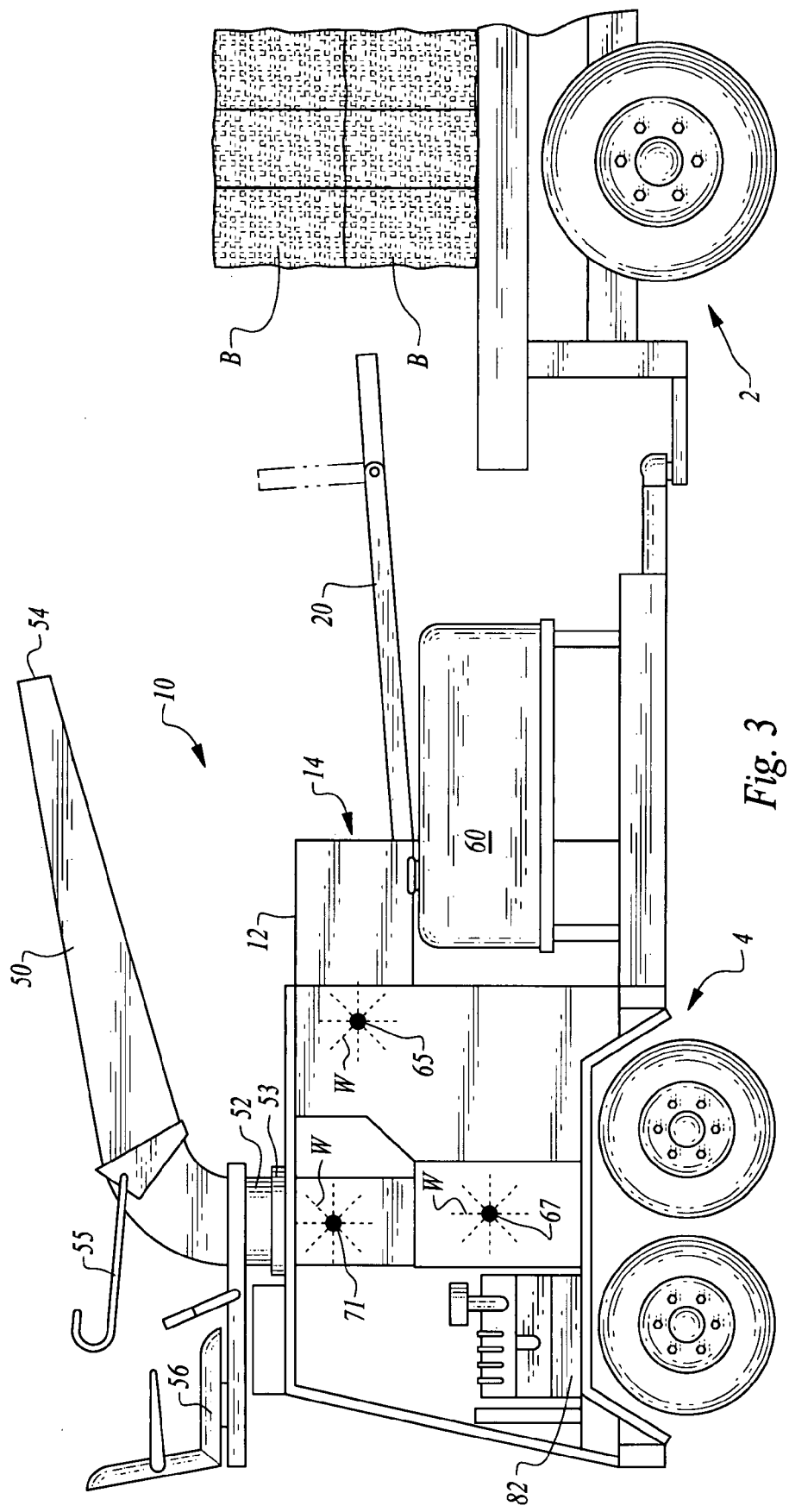
FIG. 3 is a front elevation view of a straw blower fitted with the dust control system of this invention.

Referring to the drawings, wherein like reference numerals represent like parts throughout the various drawing figures, reference numeral 10 (FIGS. 1-5) is directed to a system for control of dust ejection from a straw blowing machine. The invention can be considered to be a kit for inclusion upon an existing straw blowing machine to add dust suppression attributes, or can be considered as a modified form of straw blowing machine which includes dust suppression therein. With this system 10, water W is added to the straw S (FIG. 2) between an inlet 14 for the straw in the form of bales B, and an outlet tip 54 of a chute 50 which blows straw S out of the overall straw blowing machine.

In essence, and with particular reference to FIGS. 1 and 2, basic details of the system of this invention are described. A typical prior art straw blowing machine includes a conveyor 20 for delivering bales B to the inlet 14 of the straw blowing machine. After the bales B pass through the inlet 14, they are carried into a shredder 30. The shredder 30 has teeth 32 thereon which beat upon and shred the bale B, only allowing the straw S to pass after it has been loosened from the bale B and is ready for blowing. A blower fan 40 is located downstream from the shredder 30. The blower fan 40 blows air A into the straw S and blows the straw S to a throat 52 of a chute 50. The chute 50 extends from the throat 52 to an outlet tip 54 which can typically be oriented in various different positions by an operator. Straw S is then blown out of the outlet tip 54 of the chute 50.

With this invention, at least one water tank 60 is provided as a preferred form of source of water. Water lines 61 pass out of the water tanks 60 and on to various different inlets, such as inlets 63, 65, 71 (FIG. 2) and with valves such as the valves 62, 64, 70 provided to control water flow to these inlets 63, 65, 71. These inlets 63, 65, 71, or other configurations of inlets, spray the water W against the straw S to wet the straw S to some degree. The water W is applied to the straw S sufficient to cause dust within the straw S to stick to the straw S, rather than being free. Thus, when the straw S is blown out of the chute 50, the dust is not free, but rather remains entrained to the straw S and air quality is not negatively impacted by operation of the straw blowing machine.

More specifically, and with particular reference to FIGS. 1-5, details of the prior art straw blowing machine to which the system of this invention is adapted, are initially described to the extent necessary to illustrate the function of the dust control system of this invention. The straw blowing machine is typically in the form of a wheeled vehicle 4 that can be self-propelled or towed by another vehicle such as a towing vehicle 2. In a typical operation, the towing vehicle 2 is in the form of a flatbed truck or other truck which can support a large number of straw bales B thereon.

The straw blowing machine includes a conveyor 20 which extends from the straw blower vehicle 4 toward the towing vehicle 2. Operators standing on the towing vehicle 2 can take bales B and place them onto the conveyor 20 (FIG. 2) to be carried into the straw blower machine. The conveyor 20 could be in the form of a smooth trough located at a sloping angle so that gravity merely feeds the bales B into the machine. Alternatively, the conveyor 20 could be in the form of a moving belt to convey the bales B into the straw blowing machine.

The conveyor 20 leads up to an inlet 14 for the straw blowing machine. Typically, the straw blowing machine has a the shredder 30 and blower 40 contained within a housing 12 extending from the inlet 14 to the chute 50, and with the chute 50 also being enclosed so that the housing 12 can be considered to extend from the inlet 14 all the way to the outlet tip 54 of the chute 50. This housing 12 serves the general function of containing the straw S within the straw blowing machine until it is ready to be ejected from the chute 50.

The shredder 30 is located downstream from the inlet 14 and downstream from the conveyor 20. The shredder 30 is typically in the form of a cylinder with a series of teeth extending radially from a central axis of the cylindrical shredder 30. The shredder 30 is caused to rotate within a housing and with the teeth located close enough to walls of the housing 12 so that the straw S can only pass the shredder 30 in small quantities. Hence, when a bale B of the straw S impacts the shredder 30, the bale B cannot pass the shredder 30 until the straw S within the bale B is torn off of the bale B and allowed to pass in small and loose quantities of straw S. The shredder 30 could have a variety of different configurations to optimize its effectiveness in loosening the straw S out of the bale B as effectively as possible.

A blower fan 40 is provided downstream from the shredder 30. This blower fan 40 typically includes fan blades coupled to a motor and has an air inlet that receives air A from a surrounding environment and blows it into an interior of the housing 12 downstream from the shredder 30. The blower fan 40 is oriented so that it blows the air A toward a throat 52 of the chute 50. The loose straw S downstream from the shredder 30 is introduced into the space between the blower fan 40 and the throat 52 of the chute 50. The straw S is thus entrained in this flow of air A and is blown along with the air A from the blower fan 40 into the throat 52 of the chute 50.

The chute 50 is a long tubular conduit that has a hollow interior extending from the throat 52 to an outlet tip 54. The throat 52 preferably faces downwardly and is generally circular and surrounded by a circular bearing 53. This bearing 53 allows the entire chute 50 to rotate so that the outlet tip 54 of the chute 50 can be positioned where desired by a user for delivery of the straw S ejected from the chute 50. Above the throat 52, the chute 50 has a sharp bend and then extends out to the outlet tip 54. A steering arm 55 is mounted to the chute 50 to allow a user sitting on the seat 56 to easily adjust a direction in which the chute 50 is pointed. Note for instance in FIG. 4 how the chute 50 can have its outlet tip 54 oriented in a variety of different positions shown in broken lines in FIG. 4.

The conveyor 20, shredder 30 and blower fan 40 each require input power to operate. Typically, a motor is provided on the straw blower vehicle 4, such as the motor 82. This motor 82 can provide power for the blower fan 40, shredder 30 and conveyor 20. In particular, mechanical linkages can be coupled directly to the conveyor 20, shredder 30 and blower fan 40. Alternatively, the motor 82 could drive a master hydraulic pump which would then deliver elevated pressure hydraulic fluid to separate hydraulic motors coupled to the conveyor 20, shredder 30 and blower fan 40. As another alternative, the motor 82 could be coupled to a generator which charges batteries and the conveyor 20, shredder 30 and blower fan 40 could have separate electric motors drawing electric power from these batteries charged by the motor 82.

With particular reference to FIG. 1, the system 10 of this invention is illustrated for adding dust control to a typical prior art straw blowing machine. The general concept of this invention is to wet the straw S somewhere between the inlet 14 and the outlet tip 54 of the chute 50, so that the straw S will cause dust to either remain within the housing 12 or cling to the straw S, and not be freely discharged out of the chute 50 along with the straw S in a way that would degrade air quality, and otherwise provide a nuisance.

In FIG. 1 a broadest array of water inlets and valves are shown, illustrating each of the variety of locations where such inlets and valves can be located. In particular, and with reference to FIG. 1, water lines 61 extend out from the water tank 60. These water lines 61 feed seven inlets through seven valves. A first inlet 63 downstream from a first valve 62 is oriented to apply water W to the straw S before the straw S reaches the shredder 30. The second inlet 65 downstream from the second valve 64 is oriented to apply water W at the location of the shredder 30. The third inlet 67 downstream from the third valve 66 is located to apply water W to the straw S between the shredder 30 and the blower fan 40.

The fourth inlet 69 is located downstream from the fourth valve 68 and is oriented to apply water W to the straw S just downstream from the blower fan 40, or within the blower fan 40. The fifth inlet 71 is located downstream from the fifth valve 70 and is oriented to apply water W to the straw S upstream from an inlet throat 52 of the chute 50. A sixth inlet 73 is located downstream from a sixth valve 72 and is oriented to apply water W to the straw S within the throat 52 of the chute 50. A seventh inlet 75 is located downstream from a seventh valve 74 and is oriented to apply water to the straw S downstream from the throat 52 of the chute 50 and somewhere within the chute 50 upstream of the outlet tip 54 of the chute 50.

While the water tanks 60 could be elevated pressure water tanks so that no pumping would be required for delivery of the water W through the waterlines 61, most preferably at least one water pump is located somewhere between the water tank 60 and the various water inlets 63, 65, 67, 69, 71, 73, 75. Such water pumps can be powered in a similar fashion as the conveyor 20, shredder 30 and blower fan 40 by receiving power in some form from the motor 82.

Figure 4:
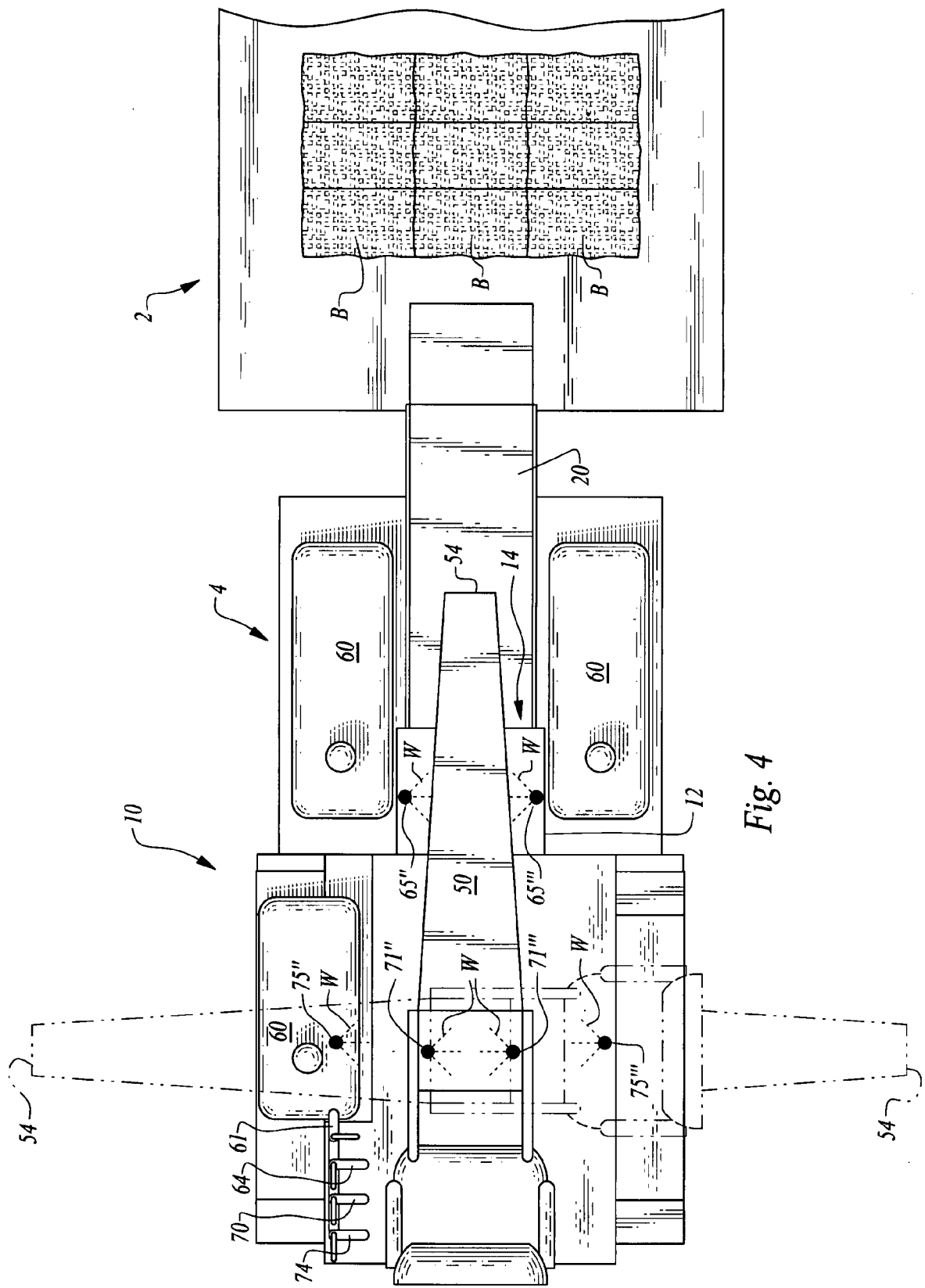
FIG. 4 is a top plan view of that which is shown in FIG. 3.

With particular reference to FIG. 2, a particular configuration for the system 10 of this invention is disclosed. In particular, FIG. 2 most clearly shows that at each location for application of water W to the straw S, more than one water W spray inlet is provided. For instance, adjacent the inlet 14, the first inlet 63 is actually in the form of multiple inlets 63, 63', with one of the inlets shown above the bale B and one of the inlets shown below the bale B. As best shown in FIG. 4, in fact side sprayers can also be provided. Hence, each of the inlets 63, 65, 67, 69, 71, 73, 75 could in fact be a large number of separate sprayers, with four separate sprayers being most preferred including sprayers, above, below and on either side of the straw S as it passes between the inlet 14 and the outlet tip 54 of the chute 50. In this way, water W can best come into contact with all of the dust and lightly wet all of the straw S.

Figure 5:
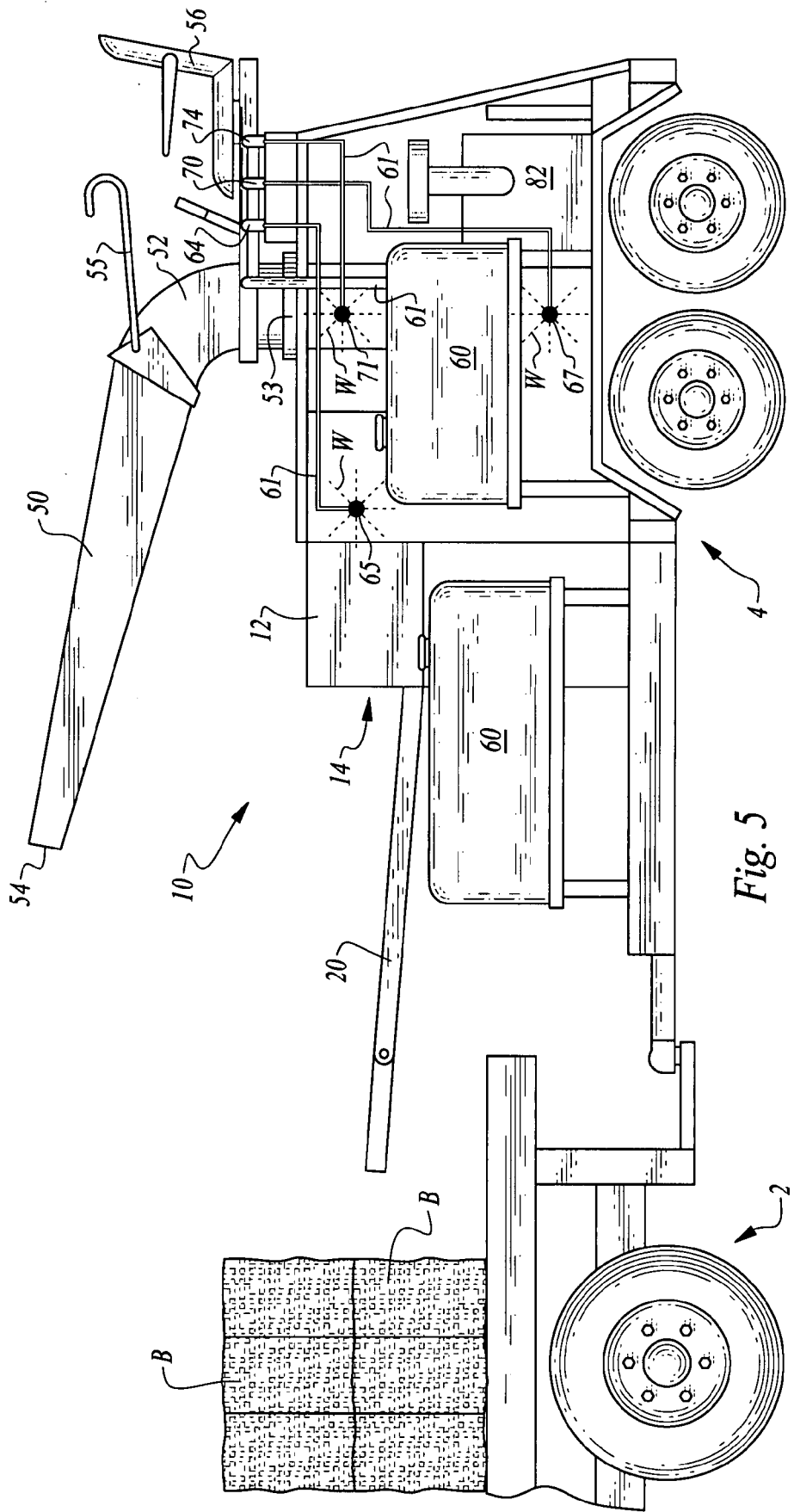
FIG. 5 is an elevation view of the straw blower fitted with the dust control system of this invention and from a viewpoint opposite that of FIG. 3.

In FIG. 2, only three inlet locations are provided, including the first inlet 63, second inlet 65 and fifth inlet 71. A most preferred form of the invention is shown in FIGS. 3-5 where inlets are not utilized to wet the bale B of straw S, but rather are provided adjacent the shredder 30 through the second inlet 65, downstream from the blower fan 40 at the third inlet 67 and just upstream of the throat 52 of the chute 50 at the fifth inlet 71.

Valves 64, 70 and 74 (FIGS. 4 and 5) are located directly adjacent the seat 56 so that an operator sitting on the seat 56 can easily manipulate the valves 64, 70, 74. In particular, a user will typically gauge an amount of dust being distributed by the straw blower. If the straw S does not have a lot of dust associated therewith, perhaps only the first valve need be opened, with the other two valves remaining closed. If the straw S is being distributed with too much dust, the second valve can also be opened with the third valve remaining closed. If the blower is still ejecting too much dust, the third valve can also be opened.

In this preferred embodiment, an operator can carefully control an amount of water usage to just the amount of water required to eliminate dust ejected from the chute 50. This is important to avoid having to make stops to refill the water tanks too often, while still maintaining straw S flow without air quality degradation.

With reference to FIG. 1, controls 80 are shown for operating the various different valves 62, 64, 66, 68, 70, 72, 74. These controls 80 could be in the form of separate levers coupled to the valves for manual control. As another alternative, dust sensors could be provided at various different locations within the system. The controls 80 could be in the form of automatic controls that would increase water flow when high levels of dust are sensed and decrease water levels when little or no dust is sensed. Preferably, the controls are of a type which allow not only for opening and closing of valves but also for setting valves at midpoints between a substantially opened and a substantially closed position for metering of only a partial flow of water W to various different water inlets if desired.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified.

What is claimed is:

1. A dust control system for a straw blowing machine, comprising in combination:
   a straw inlet;
   a shredder downstream from said-inlet;
   a blower fan downstream from said shredder;
   a discharge chute downstream from said blower fan;
   a source of water;
   at least one water inlet coupled to said source of water; and
   said water inlet adapted to apply water to the straw sufficient to adhere any adjacent dust to the straw, said water inlet located between said straw inlet and an outlet tip of said discharge chute.

2. The system of claim 1 wherein said at least one water inlet includes a sprayer, such that water is applied to the straw from said water inlet in the form of a spray.

3. The system of claim 2 wherein said sprayer is located inside of a wall of a housing at least partially surrounding the shredder and the blower fan.

4. The system of claim 1 wherein a valve is interposed between said at least one water inlet and said source of water, said valve adapted to control flow of water between said source of water and said at least one water inlet.

5. The system of claim 1 wherein said source of water includes a water tank.

6. The system of claim 5 wherein said tank is adapted to hold water therein at substantially atmospheric pressure, and wherein a pump is interposed between said tank and said at least one water inlet.

7. The system of claim 1 wherein at least two water inlets are coupled to said source of water with one of said at least two water inlets located upstream of said blower fan to apply water to the straw before the straw reaches the blower fan, and one of said at least two inlets is adapted to apply water to the straw after the straw has passed the blower fan.

8. The system of claim 7 wherein at least one valve is interposed between each of said at least two water inlets and said source of water, said valves adapted to be separately adjustable between a closed position and an open position.

9. The system of claim 8 wherein at least three water lines extend from said source of water to three separate water inlets with each of said water lines having a separate valve thereon, each of said valves separately adjustable between a substantially open position and a substantially closed position, at least one of said valves adapted to apply water to the straw before the blower fan when open, and at least one of the valves adapted to apply water to the straw after the straw passes the blower fan.

10. A method for blowing straw while reducing dust ejected from a straw blowing machine including the steps of:
  providing a straw inlet, a shredder downstream from the inlet, a blower fan downstream from the shredder and a discharge chute downstream from the blower fan;
  locating at least one water inlet between the straw inlet and an outlet tip of the chute, the water inlet adapted to wet the straw;
  blowing straw from the outlet tip; and
  applying water to the straw between the straw inlet and the outlet tip of the chute, sufficient to adhere any adjacent dust to the straw.

11. The method of claim 10 including the further step of configuring the at least one water inlet as a sprayer.

12. The method of claim 11 including the further step of interposing a valve between the at least one water inlet and a source of water, the valve adjustable between a substantially open position and a substantially closed position.

13. The method of claim 10 wherein said locating step includes the steps of providing at least one water inlet at least partially upstream of the blower fan and providing at least one water inlet at least partially downstream of the blower fan.

14. The method of claim 13 including the further step of locating a valve upstream of the water inlet adapted to apply water to the straw upstream of the blower fan and interposing at least one valve upstream of the water inlet adapted to apply water to the straw downstream of the blower fan.

15. A straw blowing machine with dust suppression, comprising in combination:
  a straw inlet;
  a blower fan downstream from said straw inlet;
  a chute having an outlet tip;
  said chute adapted to eject straw from the straw blowing machine;
  said chute located downstream from said blower fan;
  at least one water inlet between said straw inlet and said outlet tip of said chute; and
  said water inlet adapted to apply water to the straw between said water inlet and said outlet tip of said chute.

16. The straw blower of claim 15 wherein a housing is provided surrounding said blower fan, said housing adapted to contain straw between said straw inlet and said chute outlet tip, said water inlet mounted inside of said housing.

17. The straw blower of claim 16 wherein said water inlet is in the form of a sprayer, said sprayer adapted to apply a spray of water to the straw in an amount causing dust adjacent the straw to adhere to the straw.

18. The straw blower of claim 15 wherein a shredder is interposed between said straw inlet and said blower fan.

19. The straw blower of claim 18 wherein said at least one water inlet includes at least one water inlet downstream from said shredder and at least one water inlet located at least partially downstream from said blower fan.

* * * * *